(12) United States Patent
Yu et al.

(10) Patent No.: US 11,556,158 B2
(45) Date of Patent: Jan. 17, 2023

(54) ON-THE-GO (OTG) CONTROL AND CONFIGURATION METHOD, MOBILE TERMINAL, AND STORAGE MEDIUM

(71) Applicant: JRD Communication (Shenzhen) LTD., Shenzhen (CN)

(72) Inventors: Bin Yu, Shenzhen (CN); Weiqin Yang, Shenzhen (CN)

(73) Assignee: JRD Communication (Shenzhen) LTD., Shenzhen (CN)

(*) Notice: Subject to any disclaimer, the term of this patent is extended or adjusted under 35 U.S.C. 154(b) by 412 days.

(21) Appl. No.: 16/955,189

(22) PCT Filed: Dec. 26, 2018

(86) PCT No.: PCT/CN2018/124059
§ 371 (c)(1),
(2) Date: Jun. 18, 2020

(87) PCT Pub. No.: WO2019/129108
PCT Pub. Date: Jul. 4, 2019

(65) Prior Publication Data
US 2020/0333863 A1    Oct. 22, 2020

(30) Foreign Application Priority Data

Dec. 29, 2017 (CN) .......................... 201711484304.X

(51) Int. Cl.
G06F 13/10 (2006.01)
G06F 1/26 (2006.01)

(52) U.S. Cl.
CPC ............ G06F 1/266 (2013.01); G06F 13/102 (2013.01)

(58) Field of Classification Search
None
See application file for complete search history.

(56) References Cited

U.S. PATENT DOCUMENTS

| 2013/0326254 A1 | 12/2013 | Lorin et al. | |
| 2015/0171647 A1* | 6/2015 | Zhao | H02J 7/007 320/162 |

FOREIGN PATENT DOCUMENTS

| CN | 103576544 | 2/2014 |
| CN | 104167789 | 11/2014 |
| CN | 107508354 | 12/2017 |

(Continued)

OTHER PUBLICATIONS

International Search Report and the Written Opinion dated Mar. 15, 2019 From the International Searching Authority Re. Application No. PCT/CN2018/124059. (9 Pages).

*Primary Examiner* — Scott C Sun

(57) ABSTRACT

A mobile terminal, an on-the-go (OTG) control and configuration method, and a storage medium, wherein the method includes: obtaining an accumulated number of changes of differences in voltages of at least one of a positive data line and a negative data line in an OTG data cable at intervals; according to the accumulated number of changes of the differences in the voltages of at least one of the positive data line and the negative data line in the OTG cable, querying a lookup table pre-stored in the mobile terminal for a current value corresponding to the number of changes; and according to the queried current value, controlling the mobile terminal to set the current value as a current limit for an OTG peripheral device.

20 Claims, 2 Drawing Sheets

(56) References Cited

FOREIGN PATENT DOCUMENTS

CN 108108004 6/2018
WO WO 2019/129108 7/2019

\* cited by examiner obtaining an accumulated number of changes of a voltage differences in voltages of at least one of a positive data line and a negative data line in an OTG data cable at intervals by counting the differences in the voltages of at least one of the positive data line and the negative data line as varied once in the OTG cable if the differences in the voltages of at least one of the positive data line and the negative data line calculated this time is greater than the differences in the voltages of at least one of the positive data line and the negative data line previously calculated for a threshold values ⎯ S100 according to the accumulated number of changes of the differences in the voltages of at least one of the positive data line and the negative data line in the OTG cable, querying a lookup table pre-stored in the mobile terminal for a current value corresponding to the number of changes ⎯ S200 according to the queried current value, controlling the mobile terminal to set the current value as a current limit for an OTG peripheral device ⎯ S300

FIG. 1

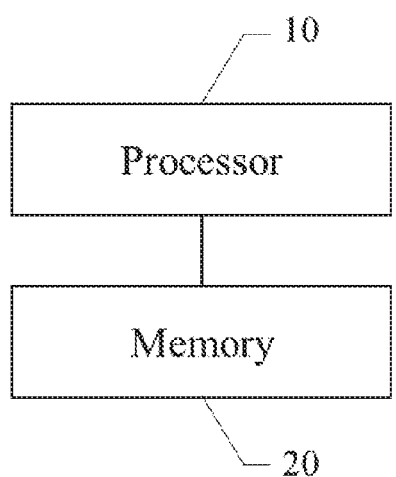

FIG. 2

ON-THE-GO (OTG) CONTROL AND CONFIGURATION METHOD, MOBILE TERMINAL, AND STORAGE MEDIUM

RELATED APPLICATIONS

This application is a National Phase of PCT Patent Application No. PCT/CN2018/124059 having International filing date of Dec. 26, 2018, which claims the benefit of priority of Chinese Patent Application No. 201711484304.X, filed on Dec. 29, 2017. The contents of the above applications are all incorporated by reference as if fully set forth herein in their entirety.

TECHNICAL FIELD AND BACKGROUND OF THE INVENTION

The present application relates to the mobile terminal field, and more particularly, to a mobile terminal, an on-the-go (OTG) control and configuration method, and a storage medium.

On-the-go, abbreviated as OTG, is a technology developed and widely used in recent years. The OTG technology was released by USB Implementers Forum in December 2001, and is mainly used for connection between various devices or mobile terminal devices, as well as data exchange. With development of the OTG technology and other technologies, a mobile terminal may power a USB flash disk and other devices connected to it and perform common operations such as file copy by using the OTG technology. The mobile terminal may also power a mouse and other devices connected to it and obtain a mouse trajectory by using the OTG technology.

Currently, as long as an OTG peripheral device is connected to the mobile terminal, the mobile terminal will automatically charge the OTG peripheral device, and when a critical operation is performed between the mobile terminal and the OTG peripheral device, a large amount of data may be transmitted at high speed in a cable, or a small amount of data transmitted may be small but extremely critical to the operation, and it is necessary to maintain stability of voltages in the cable. Since currents will change at any time during a process of charging the OTG peripheral device by the mobile terminal, this results in changes of the voltages in the cable, thereby leading to current changes causing interference to the OTG operation. When the operation performed is not critical, it may be repaired by re-delivering operation contents, but if the operation is critical (such as formatting the USB flash disk), the OTG peripheral device will crash, causing inconvenience to users.

Therefore, it is necessary to solve defects of the existing technology and make developments.

SUMMARY OF THE INVENTION

Embodiments of the present invention provide a mobile terminal, an on-the-go (OTG) control and configuration method, and a storage medium. When the mobile terminal is connected to a peripheral device through an OTG cable, stability of voltages in the cable may be guaranteed while the mobile terminal charges the OTG peripheral device, so that critical operation instructions transmitted by the mobile terminal may be successfully delivered to the peripheral device.

In a first aspect, an embodiment of the present invention provides an on-the-go (OTG) control and configuring method for a mobile terminal, comprising:

obtaining an accumulated number of changes of differences in voltages of at least one of a positive data line and a negative data line in an OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for a threshold value.

according to the accumulated number of changes of the differences in the voltages of at least one of the positive data line and the negative data line in the OTG cable, querying a lookup table pre-stored in the mobile terminal for a current value corresponding to the number of changes; and according to the queried current value, controlling the mobile terminal to set the current value as a current limit for an OTG peripheral device.

According to the OTG control and configuring method, wherein before obtaining the accumulated number of changes of the differences in the voltages of at least one of the positive data line and the negative data line in the OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value, the method further comprises:

pre-setting a relation between the accumulated number of changes of the differences in the voltages of at least one of the positive data line and the negative data line in the OTG cable and a current transmitted through the OTG cable, and generating the lookup table corresponding to the number of changes of the differences in the voltages of at least one of the positive data line and the negative data line in the OTG cable.

According to the OTG control and configuring method, wherein obtaining the accumulated number of changes of the differences in the voltages of at least one of the positive data line and the negative data line in the OTG cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value comprises:

setting a timer to obtain a voltage of the positive data line and a voltage of the negative data line in the OTG cable at intervals;

calculating a difference between the voltage of the positive data line and the voltage of the negative data line; and counting the voltage difference between the positive data line and the negative data line as varied once in the OTG cable if the difference between the voltage of the positive data line and the voltage of the negative data line calculated this time is greater than the difference between the voltage of the positive data line and the voltage of the negative data line previously calculated for the threshold value.

According to the OTG control and configuring method, wherein obtaining the accumulated number of changes of the differences in the voltages of at least one of the positive data line and the negative data line in the OTG cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value comprises:

setting a timer to obtain a voltage of the positive data line in the OTG cable at intervals;

calculating a difference in the voltage of the positive data line; and counting the difference in the voltage of the positive data line as varied once in the OTG cable if the difference between the voltage of the positive data line calculated this time and the voltage of the positive data line previously calculated is greater than the threshold value.

According to the OTG control and configuring method, wherein obtaining the accumulated number of changes of the differences in the voltages of at least one of the positive data line and the negative data line in the OTG cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value comprises:

setting a timer to obtain a voltage of the negative data line in the OTG cable at intervals;

calculating a difference in the voltage of the negative data line; and counting the difference in the voltage of the negative data line as varied once in the OTG cable if the difference between the voltage of the negative data line calculated this time and the voltage of the negative data line previously calculated is greater than the threshold value.

According to the OTG control and configuring method, wherein according to the accumulated number of changes of the differences in the voltages of at least one of the positive data line and the negative data line in the OTG cable, querying the lookup table pre-stored in the mobile terminal for the current value corresponding to the number of changes comprises:

obtaining the accumulated number of changes of the differences in the voltages of at least one of the positive data line and the negative data line in the OTG cable by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value; and according to the accumulated number of changes of the differences in the voltages of at least one of the positive data line and the negative data line in the OTG cable, querying the lookup table pre-stored in the mobile terminal for the current value corresponding to the number of changes.

According to the OTG control and configuring method, wherein according to the queried current value, controlling the mobile terminal to set the current value as the current limit for the OTG peripheral device comprises:

obtaining the queried current value; and according to the queried current value, controlling the mobile terminal to set the current value as the current limit for the OTG peripheral device.

In a second aspect, an embodiment of the present invention provides a mobile terminal, comprising a processor and a memory connected to the processor, wherein an on-the-go (OTG) control configuration program is stored in the memory, the processor is configured to call the OTG control configuration program, and when executed by the processor, the OTG control configuration program implements steps of:

obtaining an accumulated number of changes of differences in voltages of at least one of a positive data line and a negative data line in an OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for a threshold value;

according to the accumulated number of changes of the differences in the voltages of at least one of the positive data line and the negative data line in the OTG cable, querying a lookup table pre-stored in the mobile terminal for a current value corresponding to the number of changes; and according to the queried current value, controlling the mobile terminal to set the current value as a current limit for an OTG peripheral device.

According to the mobile terminal, wherein when executed by the processor, the OTG control configuration program further implements steps of:

pre-setting a relation between the accumulated number of changes of the differences in the voltages of at least one of the positive data line and the negative data line in the OTG cable and a current transmitted through the OTG cable, and generating the lookup table corresponding to the number of changes of the differences in the voltages of at least one of the positive data line and the negative data line in the OTG cable.

According to the mobile terminal, wherein when executed by the processor, the OTG control configuration program further implements steps of:

setting a timer to obtain a voltage of the positive data line and a voltage of the negative data line in the OTG cable at intervals;

calculating a difference between the voltage of the positive data line and the voltage of the negative data line; and counting the voltage difference between the positive data line and the negative data line as varied once in the OTG cable if the difference between the voltage of the positive data line and the voltage of the negative data line calculated this time is greater than the difference between the voltage of the positive data line and the voltage of the negative data line previously calculated for the threshold value.

According to the mobile terminal, wherein when executed by the processor, the OTG control configuration program further implements steps of:

setting a timer to obtain a voltage of the positive data line in the OTG cable at intervals;

calculating a difference in the voltage of the positive data line; and counting the difference in the voltage of the positive data line as varied once in the OTG cable if the difference between the voltage of the positive data line calculated this time and the voltage of the positive data line previously calculated is greater than the threshold value.

According to the mobile terminal, wherein when executed by the processor, the OTG control configuration program further implements steps of:

setting a timer to obtain a voltage of the negative data line in the OTG cable at intervals;

calculating a difference in the voltage of the negative data line; and counting the difference in the voltage of the negative data line as varied once in the OTG cable if the difference between the voltage of the negative data line calculated this time and the voltage of the negative data line previously calculated is greater than the threshold value.

According to the mobile terminal, wherein when executed by the processor, the OTG control configuration program further implements steps of:

obtaining the accumulated number of changes of the differences in the voltages of at least one of the positive data line and the negative data line in the OTG cable by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value;

according to the accumulated number of changes of the differences in the voltages of at least one of the positive data line and the negative data line in the OTG cable, querying the lookup table pre-stored in the mobile terminal for the current value corresponding to the number of changes;

obtaining the queried current value; and according to the queried current value, controlling the mobile terminal to set the current value as the current limit for the OTG peripheral device.

In a third aspect, an embodiment of the present application provides a storage medium, wherein an OTG control configuration program is stored in the storage medium, and when executed by a processor, the OTG control configuration program implements steps of:

obtaining an accumulated number of changes of differences in voltages of at least one of a positive data line and a negative data line in an OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for a threshold value;

according to the accumulated number of changes of the differences in the voltages of at least one of the positive data line and the negative data line in the OTG cable, querying a lookup table pre-stored in the mobile terminal for a current value corresponding to the number of changes; and according to the queried current value, controlling the mobile terminal to set the current value as a current limit for an OTG peripheral device.

Wherein, before the step of obtaining the accumulated number of changes of the differences in the voltages of at least one of the positive data line and the negative data line in the OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value, steps implemented by the OTG control configuration program further comprise:

pre-setting a relation between the accumulated number of changes of the differences in the voltages of at least one of the positive data line and the negative data line in the OTG cable and a current transmitted through the OTG cable, and generating the lookup table corresponding to the number of changes of the differences in the voltages of at least one of the positive data line and the negative data line in the OTG cable.

Wherein, obtaining the accumulated number of changes of the differences in the voltages of at least one of the positive data line and the negative data line in the OTG cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value comprises:

setting a timer to obtain a voltage of the positive data line and a voltage of the negative data line in the OTG cable at intervals;

calculating a difference between the voltage of the positive data line and the voltage of the negative data line; and counting the voltage difference between the positive data line and the negative data line as varied once in the OTG cable if the difference between the voltage of the positive data line and the voltage of the negative data line calculated this time is greater than the difference between the voltage of the positive data line and the voltage of the negative data line previously calculated for the threshold value.

Wherein, obtaining the accumulated number of changes of the differences in the voltages of at least one of the positive data line and the negative data line in the OTG cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value comprises:

setting a timer to obtain a voltage of the positive data line in the OTG cable at intervals;

calculating a difference in the voltage of the positive data line; and counting the difference in the voltage of the positive data line as varied once in the OTG cable if the difference between the voltage of the positive data line calculated this time and the voltage of the positive data line previously calculated is greater than the threshold value.

Wherein, obtaining the accumulated number of changes of the differences in the voltages of at least one of the positive data line and the negative data line in the OTG cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value comprises:

setting a timer to obtain a voltage of the negative data line in the OTG cable at intervals;

calculating a difference in the voltage of the negative data line; and counting the difference in the voltage of the negative data line as varied once in the OTG cable if the difference between the voltage of the negative data line calculated this time and the voltage of the negative data line previously calculated is greater than the threshold value.

Wherein, according to the accumulated number of changes of the differences in the voltages of at least one of the positive data line and the negative data line in the OTG cable, querying the lookup table pre-stored in the mobile terminal for the current value corresponding to the number of changes comprises:

obtaining the accumulated number of changes of the differences in the voltages of at least one of the positive data line and the negative data line in the OTG cable by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value; and according to the accumulated number of changes of the differences in the voltages of at least one of the positive data line and the negative data line in the OTG cable, querying the lookup table pre-stored in the mobile terminal for the current value corresponding to the number of changes.

Wherein, according to the queried current value, controlling the mobile terminal to set the current value as the current limit for the OTG peripheral device comprises:

obtaining the queried current value; and according to the queried current value, controlling the mobile terminal to set the current value as the current limit for the OTG peripheral device A mobile terminal, an OTG control and configuration method, and a storage medium are provided by the present invention. The method includes: obtaining a number of changes of a voltage difference between a positive data line (DP) and a negative data line (DM) in an OTG cable at intervals; according to the number of changes of the voltage difference between the DP and the DM in the OTG cable, querying a lookup table pre-stored in the mobile terminal for a current value corresponding to the number of changes; and controlling the mobile terminal to set the current value obtained in the previous steps (i.e. the queried current value) as a current limit for an OTG peripheral device in the method. When the OTG peripheral device is connected to the mobile terminal, stability of voltages in the cable is guaranteed while charging the OTG peripheral device, so that critical operation instructions transmitted by the mobile terminal may be successfully delivered to the peripheral device. This ensures the stability of a connection and provides convenience for users.

BRIEF DESCRIPTION OF THE SEVERAL VIEWS OF THE DRAWINGS

FIG. 1 is a flowchart of an on-the-go (OTG) control and configuration method for a mobile terminal according to an embodiment of the present invention.

FIG. 2 is a functional schematic block diagram of a mobile terminal according to an embodiment of the present invention.

DESCRIPTION OF SPECIFIC EMBODIMENTS OF THE INVENTION

Figure 3:
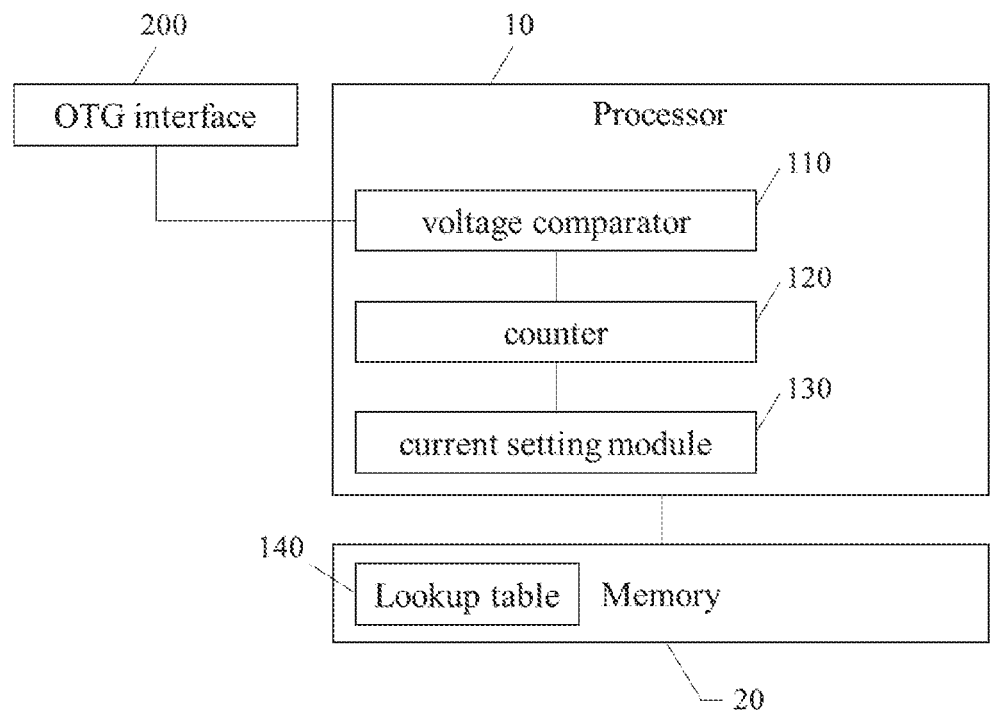
FIG. 3 is another functional schematic block diagram of a mobile terminal according to an embodiment of the present invention.

To make the objectives, technical schemes, and advantages of the present invention clearer and more specific, the present invention is described in further detail below with reference to the embodiments in accompanying with the appending drawings. It should be understood that the specific embodiments described herein are merely for explaining the present invention, and are not intended to limit the present invention.

Refer to FIG. 1, which is a flowchart of an on-the-go (OTG) control and configuration method for a mobile terminal according to an embodiment of the present invention. According to the OTG control and configuration method for the mobile terminal described in the embodiments of the present invention, the method includes the steps of:

Step S100: obtaining an accumulated number of changes of differences in voltages of at least one of a positive data line and a negative data line in an OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for a threshold value.

Before specifically implementing the embodiment of the present invention, it needs to pre-set a relation between the number of changes of the differences in the voltages of at least one of the positive data line (DP) and the negative data line (DM) in the OTG cable and a current transmitted through the OTG cable, and generating a lookup table corresponding to the number of changes of the differences in the voltages of at least one of the positive data line and the negative data line in the OTG cable on the mobile terminal such as a mobile phone.

For example, settings in the present invention are:

if the number of changes varies from 100 to 300 times in one second, the corresponding current is 300 milliamperes (mA);

if the number of changes varies more than 300 times in one second, the corresponding current is 200 milliamperes (mA); and if the number of changes varies less than 100 times in one second, the corresponding current is 500 milliamperes (mA).

Wherein, obtaining the number of changes of the differences in the voltages of at least one of the positive data line and the negative data line in the OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value includes the steps of: for example, setting a timer to obtain a voltage of the positive data line and a voltage of the negative data line in the OTG cable at intervals (such as one second);

calculating a difference between the voltage of the positive data line and the voltage of the negative data line; and counting the voltage difference between the positive data line and the negative data line as varied once in the OTG cable if the difference between the voltage of the positive data line and the voltage of the negative data line calculated this time is greater than the difference between the voltage of the positive data line and the voltage of the negative data line previously calculated for the threshold value.

The threshold value described in the embodiment of the present invention may be 50 millivolts (mV). In another embodiment, obtaining the number of changes of the differences in the voltages of at least one of the positive data line and the negative data line in the OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value, including the steps of:

setting a timer to obtain a voltage of the positive data line in the OTG cable at intervals; calculating a difference in the voltage of the positive data line; and counting the difference in the voltage of the positive data line as varied once in the OTG cable if the difference between the voltage of the positive data line calculated this time and the voltage of the positive data line previously calculated is greater than the threshold value of 50 mV.

When a difference between the voltage of the negative data line calculated this time and the voltage of the negative data line previously calculated is greater than the threshold value (such as 50 mV), the difference in the voltage of the negative data line is counted as varied once in the OTG cable. In another embodiment, obtaining the number of changes of the differences in the voltages of at least one of the positive data line and the negative data line in the OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value, including the steps of:

setting a timer to obtain a voltage of the negative data line in the OTG cable at intervals; calculating a difference in the voltage of the negative data line; and counting the difference in the voltage of the negative data line as varied once in the OTG cable if the difference between the voltage of the negative data line calculated this time and the voltage of the negative data line previously calculated is greater than the threshold value of 50 mV.

Further, the number of changes of the differences in voltages of at least one of the positive data line and the negative data line in the OTG data cable is sequentially accumulated and record by the same counter.

Step S200: according to the accumulated number of changes of the differences in the voltages of at least one of the positive data line and the negative data line in the OTG cable, querying the lookup table pre-stored in the mobile terminal for a current value corresponding to the number of changes.

In the present invention, according to the accumulated number of changes of the differences in the voltages of at least one of the positive data line and the negative data line in the OTG cable, querying the lookup table pre-stored in the mobile terminal for the current value corresponding to the number of changes includes the steps of: obtaining the accumulated number of changes of the differences in the voltages of at least one of the positive data line and the negative data line in the OTG cable; and according to the accumulated number of changes of the differences in the voltages of at least one of the positive data line and the negative data line in the OTG cable, querying the lookup table pre-stored in the mobile terminal for the current value corresponding to the number of changes.

For example, in the lookup table:

if the number of changes varies from 100 to 300 times in one second, the queried current value is 300 milliamperes (mA).

if the number of changes varies more than 300 times in one second, the queried current value is 200 milliamperes (mA).

if the number of changes varies less than 100 times in one second, the queried current value is 500 milliamperes (mA).

Step S300: according to the queried current value, controlling the mobile terminal to set the current value as a current limit for an OTG peripheral device.

In the present step, the queried current value will be obtained, and according to the queried current value, the mobile terminal is controlled to set the current value as the current limit for the OTG peripheral device.

For example, continuing with the above description, when the number of changes varying from 100 to 300 times in one second is queried, the current limit is set to 300 milliamperes (mA) for the OTG peripheral device by controlling the mobile terminal.

When the number of changes varying more than 300 times in one second is queried, the current limit is set to 200 milliamperes (mA) for the OTG peripheral device by controlling the mobile terminal.

When the number of changes varying less than 100 times in one second is queried, the current limit is set to 500 milliamperes (mA) for the OTG peripheral device by controlling the mobile terminal.

It can be seen as above, the present invention provides the OTG control and configuration method for the mobile terminal, and when the OTG peripheral device is connected to the mobile terminal, stability of the voltages in the cable may be guaranteed while the mobile terminal charges the OTG peripheral device, so that critical operation instructions transmitted by the mobile terminal may be successfully delivered to the peripheral device.

Of course, persons skilled in this art can understand that all or part of the steps in the method of the embodiment described above can be implemented by using an OTG control configuration program to instruct relevant hardware (such as a processor, a controller, etc.), and the program can be stored in a computer-readable storage medium. When the program is executed, it may include the steps in the method of the embodiment described above. The storage medium may be a memory, a disk, a compact disc, etc.

Embodiment Two

An embodiment of the present invention further provides a mobile terminal. The mobile terminal in the embodiment of the present invention may be a mobile phone. Shown in FIG. 2 is a functional schematic block diagram of the mobile terminal according to the embodiment of the present invention. The mobile terminal includes a processor 10 and a memory 20 connected to the processor 10 in the present embodiment.

An OTG control configuration program is stored in the memory 20. When the OTG control configuration program is executed by the processor, any one of the steps of the OTG control and configuration method for the mobile terminal in the embodiment described above is implemented. The OTG control configuration program specifically implements the steps of:

obtaining an accumulated number of changes of differences in voltages of at least one of a positive data line and a negative data line in an OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for a threshold value;

according to the accumulated number of changes of the differences in the voltages of at least one of the positive data line and the negative data line in the OTG cable, querying a lookup table pre-stored in the mobile terminal for a current value corresponding to the number of changes; and according to the queried current value, controlling the mobile terminal to set the current value as a current limit for an OTG peripheral device. The details are as described above.

The processor is used to call instructions of the OTG control configuration program.

When executed by the processor, the OTG control configuration program further implements the step of:

pre-setting a relation between the accumulated number of changes of the differences in the voltages of at least one of the positive data line and the negative data line in the OTG cable and a current transmitted through the OTG cable, and generating the lookup table corresponding to the number of changes of the differences in the voltages of at least one of the positive data line and the negative data line in the OTG cable. The details are described as above.

When executed by the processor, the OTG control configuration program further implements the steps of:

setting a timer to obtain a voltage of the positive data line and a voltage of the negative data line in the OTG cable at intervals;

calculating a difference between the voltage of the positive data line and the voltage of the negative data line; and counting the voltage difference between the positive data line and the negative data line as varied once in the OTG cable if the difference between the voltage of the positive data line and the voltage of the negative data line calculated this time is greater than the difference between the voltage of the positive data line and the voltage of the negative data line previously calculated for the threshold value. The details are as described above.

When executed by the processor, the OTG control configuration program further implements the steps of:

obtaining the accumulated number of changes of the differences in the voltages of at least one of the positive data line and the negative data line in the OTG cable;

according to the accumulated number of changes of the differences in the voltages of at least one of the positive data line and the negative data line in the OTG cable, querying the lookup table pre-stored in the mobile terminal for the current value corresponding to the number of change.

obtaining the queried current value; and according to the queried current value, controlling the mobile terminal to set the current value as the current limit for the OTG peripheral device. The details are described as above.

Embodiment Three

Shown in FIG. 3 is another functional schematic block diagram of a mobile terminal according to an embodiment of the present invention. The mobile terminal includes a processor 10, an OTG interface 200, and a memory 20 connected to the processor 10. The processor 10 is connected to the OTG interface 200, and a lookup table 140 is stored in the memory 20.

The processor 10 is used to obtain changes in voltages of the positive line (DP)/negative line (DM) signal in an OTG cable, and dynamically select a corresponding current transmitted through the OTG cable according to default strategies during the interaction between an OTG peripheral device and the mobile terminal.

The OTG interface 200 is used to connect the mobile terminal to other devices with an OTG external connection.

Continue referring to FIG. 3, which further includes a schematic diagram showing an internal structure of the processor 10. The processor 10 includes a voltage comparator 110, a counter 120, and a current setting module 130.

The voltage comparator 110 is used to compare voltage levels of two input terminals IN1, IN2. When the voltage level of the input terminal IN1 is greater than the voltage level of the input terminal IN2, an output terminal OUT is at a high level. When the voltage level of the input terminal IN1 is lower than the voltage level of the input terminal IN2, the output terminal OUT is at a low level.

The counter 120 is used to count the number of changes in the output of the output terminal OUT of the voltage comparator 110. Specifically, the counter 120 detects whether the output terminal OUT of the voltage comparator 110 generates a rising edge or a falling edge, if the output terminal OUT of the voltage comparator 110 generates the rising edge or the falling edge, the count value of the counter 120 is increased by 1.

The current setting module 130 is used to query the lookup table 140 for a current value corresponding to the count value of the counter 120.

In the present embodiment, the lookup table 140 includes the current values corresponding to ranges of the count values output by each counter 120. For example, when the count value C output by the counter 120 satisfies $0 \leq C < X1$, the current value is Y1; when the count value C output by the counter 120 satisfies $X1 \leq C < X2$, the current value is Y2; when the count value C output by the counter 120 satisfies $X2 \leq C < X3$, the current value is Y3, and the like.

Based on the mobile terminal described above, another embodiment for implementing an OTG control and configuring method for the mobile terminal in the present invention includes the steps of:

step S101: starting a timer with a timeout of 1 second;

step S102: determining whether the timer times out, if it times out, executing step S103, otherwise continuing to wait for timeout;

step S103: obtaining the count value C output by the counter 120, and querying the lookup table 140 for the current value corresponding to the count value C;

step S104, setting the current value obtained in step S103 by the setting module 130, and clearing the count value C.

Embodiment Four

Figure 4:
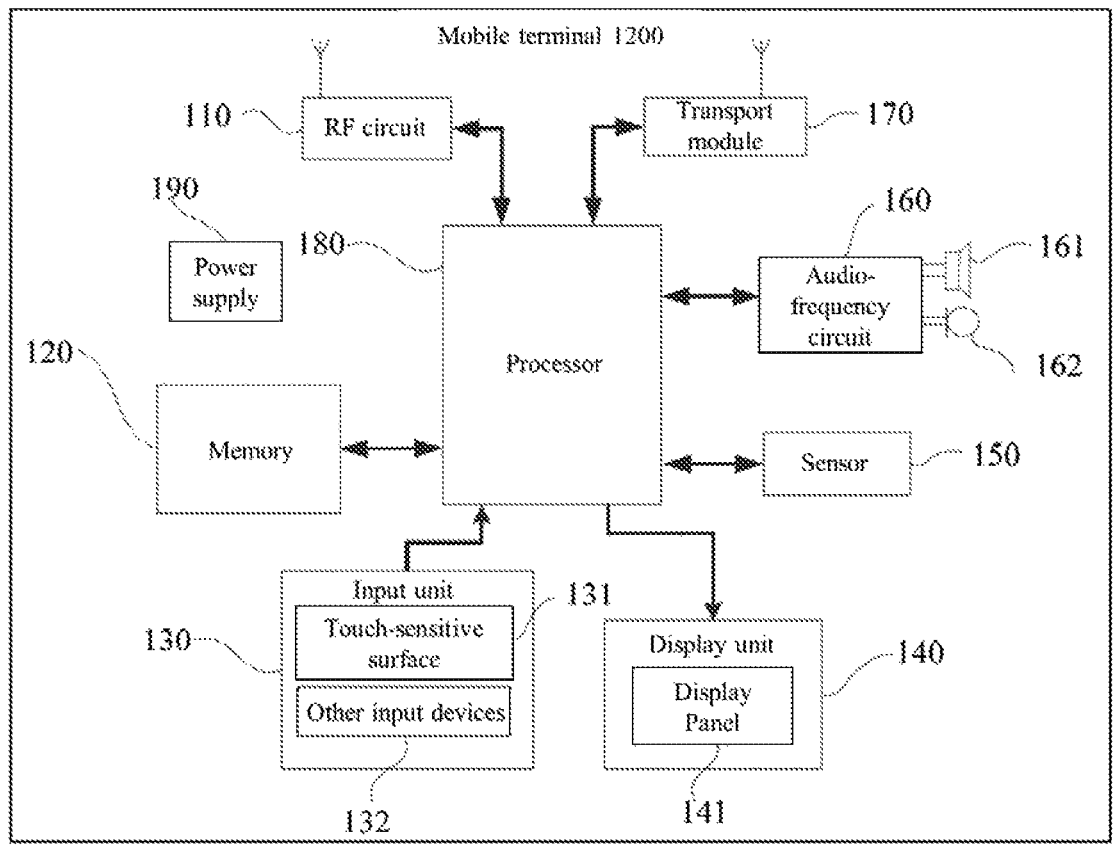
FIG. 4 is a schematic structural diagram showing a mobile terminal according to an embodiment of the present invention.

An embodiment of the present invention further provides a storage medium that stores an OTG control configuration program, and when the OTG control configuration program is executed by a processor, any one of the steps of the OTG control and configuration method for the mobile terminal in the embodiment described above is implemented. The OTG control configuration program specifically implements the steps of:

FIG. 4 is a diagram showing a specific structure of a mobile terminal according to an embodiment of the present invention. The mobile terminal can be used to implement the OTG control and configuration method for the mobile terminal in the embodiment described above. The mobile terminal 1200 may be a smart phone or a tablet computer.

As shown in FIG. 4, the mobile terminal 1200 may include a radio frequency (RF) circuit 110, one or more memories of computer-readable storage medium 120 (only one is shown in the figure), a input unit 130, a display unit 140, a sensor 150, an audio-frequency circuit 160, a transport module 170, one or more processors 180 with processing cores (only one is shown in the figure), and a power supply 190, and the like. Persons skilled in this art is able to understand that the mobile terminal 1200 structure as shown in FIG. 4 doesn't constitute a limitation on the mobile terminal 1200, and it may include more or fewer components than shown in the diagram, combine some components, or arrange different components.

The RF circuit 110 is configured to receive and issue electromagnetic wave to realize mutual conversion of electromagnetic waves and electrical signals, thereby communicating with communication networks or other devices. The RF circuit 110 may include various existing circuit components configured to execute the functions, such as antennas, RF receivers and transmitters, digital signal processors, encryption/decryption chips, subscriber identity module (SIM) cards, memories, etc. The RF circuit 110 is able to communicate with various networks, such as Internet, intranet, wireless network, or communicate with other devices by wireless network. The above wireless network may include cellular telephone network, wireless local area network (LAN), or metropolitan area network (MAN). The various communication standards, protocols and technologies may be used by the wireless network described above, that include, but is not limited to global system for mobile communication (GSM), enhanced data GSM environment (EDGE), wideband code division multiple access (WCDMA), code division multiple access (CDMA), time division multiple access (TDMA), wireless fidelity (Wi-Fi) (such as Standard of Institute of Electrical and Electronics Engineers, IEEE 802.11a, IEEE 802.11b, IEEE802.11g and/or IEEE 802.11n), voice over Internet protocol (VoIP), worldwide interoperability for microwave access (Wi-Max), other protocols for mails, instant messaging, and short messages, as well as any other suitable communication protocols, and even protocols that are not currently being developed may be included.

The memory 120 is able to be configured to store software programs and modules, such as the program commands/modules corresponding to the OTG control and configuration method for the mobile terminal in the embodiment described above. The software programs stored in the memory 120 and the modules are run by the processor 180, thereby executing various function applications and data processing to realize functions of OTG control and configuration for the mobile terminal. The memory 120 may include a high speed high-speed random access memory, may further include nonvolatile memory (NVM), such as one or more magnetic storage devices, flashes, or other nonvolatile solid-state memories. In some embodiments, the memory 120 may further include the memories which are set remotely relative to the processor 180, the remote memories can connect to the mobile terminal 1200 via networks. The embodiment of the networks described above includes but are not limited to Internet, intranet, local area network, mobile communication network and the combinations thereof.

The input unit 130 is able to be configured to receive the entered number or character information, and generate keyboard, mouse, operating arm, and optical or trackball signal inputs related to the user setting and the function control. Specifically, the input unit 130 may include a touch-sensitive surface 131 and other input devices 132. The touch-sensitive surface 131, also known as a touch display or a trackpad, can collect the user touch operations on or near it (for example, the user operates on or near the touch-sensitive surface 131 by using any suitable objects or accessories, such as a finger, stylus, or the like), and drive the corresponding connection device according to a default program. Optionally, the touch-sensitive surface 131 may include two parts which are a touch detection device and a touch controller. The touch detection device is configured to detect the user touch orientation, as well as detect the signal caused by the touch operation, and submit the signal to the touch controller. The touch controller is configured to receive the touch information from the touch detection device, and convert it into contact point coordinates, then submit it to the processor 180, and receive the commands from the processor 180 to execute it. Furthermore, a resistance type, a capacitance type, an infrared ray type, and surface acoustic wave type can be adapted to realize the touch-sensitive surface 131. Except for the touch-sensitive surface 131, the input unit 130 may further include other input devices 132. Specifically, other input devices 132 may further include but are not limited to one or more of physical keyboards, function keys (such as volume control buttons, switch buttons, and the like), a trackball, mouse, and an operating arm.

The display unit 140 is able to be configured to display information input by the user or information provided to the user and various graphical user interfaces of the mobile terminal 1200, the graphical user interfaces can be composed of graphics, texts, icons, videos, and any combination thereof. The display unit 140 may include a display panel 141. Optionally, the display panel 141 may be configured with a liquid crystal display (LCD), an organic light-emitting diode (OLED), and the like. Further, the touch-sensitive surface 131 can cover the display panel 141, and when the touch operation is detected on or near the touch-sensitive surface 131, it is submitted to the processor 180 to confirm the type of the touch event, then the processor 180 provides a corresponding visual output on the display panel 141 according to the type of the touch event. Although the touch-sensitive surface 131 and the display panel 141 are independent components for input and output functions in FIG. 4, in some embodiments, the touch-sensitive surface 131 can be integrated with the display panel 141 to realize input and output functions.

The mobile terminal 1200 may further include at least one sensor 150, such as optical sensors, motion sensors and other sensors. Specifically, the optical sensor may include an ambient light sensor and a proximity sensor, wherein the brightness of the display panel 141 can be adjusted by the ambient light sensor according to the brightness of the ambient light. The display panel 141 and/or the backlight thereof is turn off by the proximity sensor when the mobile terminal 1200 moves to the ear. As a kind of the motion sensor, the gravity acceleration sensor is able to detect the magnitude of acceleration in all directions (typically three axes), the magnitude and direction of gravity can be detected at rest, which can be used to identify the application of the phone gesture (such as horizontal and vertical screen switching, related games, and magnetometer gesture calibration), vibration recognition related functions (such as pedometer, and tapping), and the like. As for the mobile terminal 1200, it can be further configured with a gyroscope, a barometer, a hygrometer, a thermometer, an infrared sensor, and the like, which is not repeated herein.

An audio circuit 160, a speaker 161, and a microphone 162 may provide an audio interface between the user and the mobile terminal 1200. The audio circuit 160 is able to transmit the electrical signal converted by the received audio data to the speaker 161 which converts it into a sound signal to output. On the other hand, the microphone 162 converts the collected sound signal into an electrical signal, which is received and converted into audio data by the audio circuit 160, and then the audio data is output to the processor 180 for processing, and transmitted to, the other terminal through the RF circuit 110, or output to the memory 120 for further processing. The audio circuit 160 maybe include earplug jack to provide a communication between the peripheral headphone with the mobile terminal 1200.

The mobile terminal 1200 is able to help user send and receive e-mails, browse webs, and access the streaming medium, and the like, by the transport module 170 (such as the Wi-Fi module). It provides a wireless broadband internet access for the user. Although the transport module 170 is shown in FIG. 4, it can be understood that it doesn't belong to the essential components for the mobile terminal 1200, and may be omitted within the scope of without changing the essence of the invention according to the requirement.

A processor 180 is a control center of the mobile terminal 1200, it uses various interfaces and wires to connect various parts of the entire phone. The various functions of the mobile terminal 1200 and processing data are executed by running or executing the software programs stored in the memory 120 and/or modules, and recalling data stored in the memory 120, thereby monitoring the phone overall. Optionally, the processor 180 may include one or more processing cores. In some embodiments, the processor 180 can be integrated to application processors and the modem processors, wherein the application processor mainly deals with an operation system, a user interface and an application program, and the like. The modem processor mainly deals with wireless communication. It can be understood that the modem processor described above may also not be integrated to the processor 180.

The mobile terminal 1200 further includes the power supply 190 (such as a battery) for each component. In some embodiment, the power supply can be logically connected to the processor 180 by the power management system, thereby realizing functions of charging, discharging, and power consumption management, and the like. The power supply 190 may further include one or more direct current (DC) or alternating current (AC) powers, recharging systems, power failure detection circuits, power converters or inverters, power status indicator, and the other components.

In spite of not shown herein, the mobile terminal 1200 may further include cameras (such as a front camera and a rear camera), Bluetooth modules, and the like, which is not repeated herein. Specifically, in the present embodiment, the display unit of the mobile terminal is a touch screen display, the mobile terminal further includes a memory, and one or more programs, wherein the one or more programs are stored in the memory, and are used to implement the following operation instructions by the one or more processors:

obtaining an accumulated number of changes of differences in voltages of at least one of a positive data line and a negative data line in an OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for a threshold value;

according to the accumulated number of changes of the differences in the voltages of at least one of the positive data line and the negative data line in the OTG cable, querying a lookup table pre-stored in the mobile terminal for a current value corresponding to the number of changes; and according to the queried current value, controlling the mobile terminal to set the current value as a current limit for an OTG peripheral device.

Wherein, before the step of obtaining the accumulated number of changes of the differences in the voltages of at least one of the positive data line and the negative data line in the OTG cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value, the steps implemented by the OTG control configuration program further includes:

pre-setting a relation between the accumulated number of changes of the differences in the voltages of at least one of the positive data line and the negative data line in the OTG cable and a current transmitted through the OTG cable, and generating the lookup table corresponding to the number of changes of the differences in the voltages of at least one of the positive data line and the negative data line in the OTG cable.

Wherein, obtaining the accumulated number of changes of the differences in the voltages of at least one of the positive data line and the negative data line in the OTG cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value includes the steps of:

setting a timer to obtain a voltage of the positive data line and a voltage of the negative data line in the OTG cable at intervals;

calculating a difference between the voltage of the positive data line and the voltage of the negative data line; and counting the voltage difference between the positive data line and the negative data line as varied once in the OTG cable if the difference between the voltage of the positive data line and the voltage of the negative data line calculated this time is greater than the difference between the voltage of the positive data line and the voltage of the negative data line previously calculated for the threshold value.

In another embodiment, obtaining the number of changes of the differences in the voltages of at least one of the positive data line and the negative data line in the OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value, including the steps of:

setting a timer to obtain a voltage of the positive data line in the OTG cable at intervals;

calculating a difference in the voltage of the positive data line; and counting the difference in the voltage of the positive data line as varied once in the OTG cable if the difference between the voltage of the positive data line calculated this time and the voltage of the positive data line previously calculated is greater than the threshold value.

In another embodiment, obtaining the number of changes of the differences in the voltages of at least one of the positive data line and the negative data line in the OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value, including the steps of:

setting a timer to obtain a voltage of the negative data line in the OTG cable at intervals;

calculating a difference in the voltage of the negative data line; and counting the difference in the voltage of the negative data line as varied once in the OTG cable if the difference between the voltage of the negative data line calculated this time and the voltage of the negative data line previously calculated is greater than the threshold value.

Wherein, according to the accumulated number of changes of the voltage differences in the voltages of at least one of the positive data line and the negative data line in the OTG cable, querying the lookup table pre-stored in the mobile terminal for the current value corresponding to the number of changes includes the steps of:

obtaining the accumulated number of changes of the differences in the voltages of at least one of the positive data line and the negative data line in the OTG cable;

according to the accumulated number of changes of the differences in the voltages of at least one of the positive data line and the negative data line in the OTG cable, querying the lookup table pre-stored in the mobile terminal for the current value corresponding to the number of change.

Wherein, according to the queried current value, controlling the mobile terminal to set the current value as the current limit for the OTG peripheral device includes the step of:

obtaining the queried current value; and according to the queried current value, controlling the mobile terminal to set the current value as the current limit for the OTG peripheral device.

In summary, a mobile terminal, an OTG control and configuration method, and a storage medium are provided by the present invention. The method includes steps of: obtaining the number of changes of the voltage difference between DP and DM in the OTG cable at intervals; according to the number of changes of the voltage difference between the DP and the DM in the OTG cable, querying the lookup table pre-stored in the mobile terminal for the current value corresponding to the number of changes; and controlling the mobile terminal to set the current value obtained in the previous steps (i.e. the queried current value) as the current limit for the OTG peripheral device in the method. When the OTG peripheral device is connected to the mobile terminal, stability of the voltages in the cable is guaranteed while charging the OTG peripheral device, so that critical operation instructions transmitted by the mobile terminal may be successfully delivered to the peripheral device. This ensures the stability of a connection, provides convenience for users, and improves the security.

It should be understood that the application of the present invention is not limited to the above examples. For persons skilled in this art, improvements or changes can be made according to the above description, and all those improvements and changes should fall within the protection scope of the appended claims of the present invention.

What is claimed is:

1. An on-the-go (OTG) control and configuration method for a mobile terminal, comprising:

obtaining an accumulated number of changes of differences in voltages of at least one of a positive data line and a negative data line in an OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for a threshold value;

according to the accumulated number of changes of the differences in the voltages of at least one of the positive data line and the negative data line in the OTG cable, querying a lookup table pre-stored in the mobile terminal for a current value corresponding to the number of changes; and according to the queried current value, controlling the mobile terminal to set the current value as a current limit for an OTG peripheral device.

2. The method as claimed in claim 1, wherein before obtaining the accumulated number of changes of the differences in the voltages of at least one of the positive data line and the negative data line in the OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value, the method further comprises:

pre-setting a relation between the accumulated number of changes of the differences in the voltages of at least one of the positive data line and the negative data line in the OTG cable and a current transmitted through the OTG cable, and generating the lookup table corresponding to the number of changes of the differences in the voltages of at least one of the positive data line and the negative data line in the OTG cable.

3. The method as claimed in claim 1, wherein obtaining the accumulated number of changes of the differences in the voltages of at least one of the positive data line and the negative data line in the OTG cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value comprises:
setting a timer to obtain a voltage of the positive data line and a voltage of the negative data line in the OTG cable at intervals;
calculating a difference between the voltage of the positive data line and the voltage of the negative data line; and
counting the voltage difference between the positive data line and the negative data line as varied once in the OTG cable if the difference between the voltage of the positive data line and the voltage of the negative data line calculated this time is greater than the difference between the voltage of the positive data line and the voltage of the negative data line previously calculated for the threshold value.

4. The method as claimed in claim 1, wherein obtaining the accumulated number of changes of the differences in the voltages of at least one of the positive data line and the negative data line in the OTG cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value comprises:
setting a timer to obtain a voltage of the positive data line in the OTG cable at intervals;
calculating a difference in the voltage of the positive data line; and
counting the difference in the voltage of the positive data line as varied once in the OTG cable if the difference between the voltage of the positive data line calculated this time and the voltage of the positive data line previously calculated is greater than the threshold value.

5. The method as claimed in claim 1, wherein obtaining the accumulated number of changes of the differences in the voltages of at least one of the positive data line and the negative data line in the OTG cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value comprises:
setting a timer to obtain a voltage of the negative data line in the OTG cable at intervals;
calculating a difference in the voltage of the negative data line; and
counting the difference in the voltage of the negative data line as varied once in the OTG cable if the difference between the voltage of the negative data line calculated this time and the voltage of the negative data line previously calculated is greater than the threshold value.

6. The method as claimed in claim 1, wherein according to the accumulated number of changes of the differences in the voltages of at least one of the positive data line and the negative data line in the OTG cable, querying the lookup table pre-stored in the mobile terminal for the current value corresponding to the number of changes comprises:
obtaining the accumulated number of changes of the differences in the voltages of at least one of the positive data line and the negative data line in the OTG cable by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value; and
according to the accumulated number of changes of the differences in the voltages of at least one of the positive data line and the negative data line in the OTG cable, querying the lookup table pre-stored in the mobile terminal for the current value corresponding to the number of changes.

7. The method as claimed in claim 1, wherein according to the queried current value, controlling the mobile terminal to set the current value as the current limit for the OTG peripheral device comprises:
obtaining the queried current value; and
according to the queried current value, controlling the mobile terminal to set the current value as the current limit for the OTG peripheral device.

8. A mobile terminal, comprising a processor and a memory connected to the processor, wherein an on-the-go (OTG) control configuration program is stored in the memory, the processor is configured to call the OTG control configuration program, and when executed by the processor, the OTG control configuration program implements steps of:
obtaining an accumulated number of changes of differences in voltages of at least one of a positive data line and a negative data line in an OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for a threshold value;
according to the accumulated number of changes of the differences in the voltages of at least one of the positive data line and the negative data line in the OTG cable, querying a lookup table pre-stored in the mobile terminal for a current value corresponding to the number of changes; and
according to the queried current value, controlling the mobile terminal to set the current value as a current limit for an OTG peripheral device.

9. The mobile terminal as claimed in claim 8, wherein when executed by the processor, the OTG control configuration program further implements steps of:
pre-setting a relation between the accumulated number of changes of the voltage differences in the voltages of at least one of the positive data line and the negative data line in the OTG cable and a current transmitted through the OTG cable, and generating the lookup table corresponding to the number of changes of the differences in the voltages of at least one of the positive data line and the negative data line in the OTG cable.

10. The mobile terminal as claimed in claim 8, wherein when executed by the processor, the OTG control configuration program further implements steps of:

setting a timer to obtain a voltage of the positive data line and a voltage of the negative data line in the OTG cable at intervals;

calculating a difference between the voltage of the positive data line and the voltage of the negative data line; and counting the voltage difference between the positive data line and the negative data line as varied once in the OTG cable if the difference between the voltage of the positive data line and the voltage of the negative data line calculated this time is greater than the difference between the voltage of the positive data line and the voltage of the negative data line previously calculated for the threshold value.

11. The mobile terminal as claimed in claim 8, wherein when executed by the processor, the OTG control configuration program further implements steps of:

setting a timer to obtain a voltage of the positive data line in the OTG cable at intervals;

calculating a difference in the voltage of the positive data line; and counting the difference in the voltage of the positive data line as varied once in the OTG cable if the difference between the voltage of the positive data line calculated this time and the voltage of the positive data line previously calculated is greater than the threshold value.

12. The mobile terminal as claimed in claim 8, wherein when executed by the processor, the OTG control configuration program further implements steps of:

setting a timer to obtain a voltage of the negative data line in the OTG cable at intervals;

calculating a difference in the voltage of the negative data line; and counting the difference in the voltage of the negative data line as varied once in the OTG cable if the difference between the voltage of the negative data line calculated this time and the voltage of the negative data line previously calculated is greater than the threshold value.

13. The mobile terminal as claimed in claim 8, wherein when executed by the processor, the OTG control configuration program further implements steps of:

obtaining the accumulated number of changes of the differences in the voltages of at least one of the positive data line and the negative data line in the OTG cable by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value;

according to the accumulated number of changes of the differences in the voltages of at least one of the positive data line and the negative data line in the OTG cable, querying the lookup table pre-stored in the mobile terminal for the current value corresponding to the number of changes;

obtaining the queried current value; and according to the queried current value, controlling the mobile terminal to set the current value as the current limit for the OTG peripheral device.

14. A storage medium, wherein an OTG control configuration program is stored in the storage medium, and when executed by a processor, the OTG control configuration program implements steps of:

obtaining an accumulated number of changes of differences in voltages of at least one of a positive data line and a negative data line in an OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for a threshold value;

according to the accumulated number of changes of the differences in the voltages of at least one of the positive data line and the negative data line in the OTG cable, querying a lookup table pre-stored in the mobile terminal for a current value corresponding to the number of changes; and according to the queried current value, controlling the mobile terminal to set the current value as a current limit for an OTG peripheral device.

15. The storage medium as claimed in claim 14, wherein before the step of obtaining the accumulated number of changes of the voltage differences in the voltages of at least one of the positive data line and the negative data line in the OTG data cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value, steps implemented by the OTG control configuration program further comprise:

pre-setting a relation between the accumulated number of changes of the differences in the voltages of at least one of the positive data line and the negative data line in the OTG cable and a current transmitted through the OTG cable, and generating the lookup table corresponding to the number of changes of the differences in the voltages of at least one of the positive data line and the negative data line in the OTG cable.

16. The storage medium as claimed in claim 14, wherein obtaining the accumulated number of changes of the differences in the voltages of at least one of the positive data line and the negative data line in the OTG cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value comprises:

setting a timer to obtain a voltage of the positive data line and a voltage of the negative data line in the OTG cable at intervals;

calculating a difference between the voltage of the positive data line and the voltage of the negative data line; and counting the voltage difference between the positive data line and the negative data line as varied once in the OTG cable if the difference between the voltage of the positive data line and the voltage of the negative data line calculated this time is greater than the difference between the voltage of the positive data line and the voltage of the negative data line previously calculated for the threshold value.

17. The storage medium as claimed in claim 14, wherein obtaining the accumulated number of changes of the differences in the voltages of at least one of the positive data line and the negative data line in the OTG cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value comprises:
   setting a timer to obtain a voltage of the positive data line in the OTG cable at intervals;
   calculating a difference in the voltage of the positive data line; and
   counting the difference in the voltage of the positive data line as varied once in the OTG cable if the difference between the voltage of the positive data line calculated this time and the voltage of the positive data line previously calculated is greater than the threshold value.

18. The storage medium as claimed in claim 14, wherein obtaining the accumulated number of changes of the differences in the voltages of at least one of the positive data line and the negative data line in the OTG cable at intervals by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value comprises:
   setting a timer to obtain a voltage of the negative data line in the OTG cable at intervals;
   calculating a difference in the voltage of the negative data line; and
   counting the difference in the voltage of the negative data line as varied once in the OTG cable if the difference between the voltage of the negative data line calculated this time and the voltage of the negative data line previously calculated is greater than the threshold value.

19. The storage medium as claimed in claim 14, wherein according to the accumulated number of changes of the differences in the voltages of at least one of the positive data line and the negative data line in the OTG cable, querying the lookup table pre-stored in the mobile terminal for the current value corresponding to the number of changes comprises:
   obtaining the accumulated number of changes of the differences in the voltages of at least one of the positive data line and the negative data line in the OTG cable by counting the differences in the voltages of at least one of the positive data line and the negative data line as varied once in the OTG cable if the differences in the voltages of at least one of the positive data line and the negative data line calculated this time are greater than the differences in the voltages of at least one of the positive data line and the negative data line previously calculated for the threshold value; and
   according to the accumulated number of changes of the differences in the voltages of at least one of the positive data line and the negative data line in the OTG cable, querying the lookup table pre-stored in the mobile terminal for the current value corresponding to the number of changes.

20. The storage medium as claimed in claim 14, wherein according to the queried current value, controlling the mobile terminal to set the current value as the current limit for the OTG peripheral device comprises:
   obtaining the queried current value; and
   according to the queried current value, controlling the mobile terminal to set the current value as the current limit for the OTG peripheral device.

* * * * *